Figure 1:
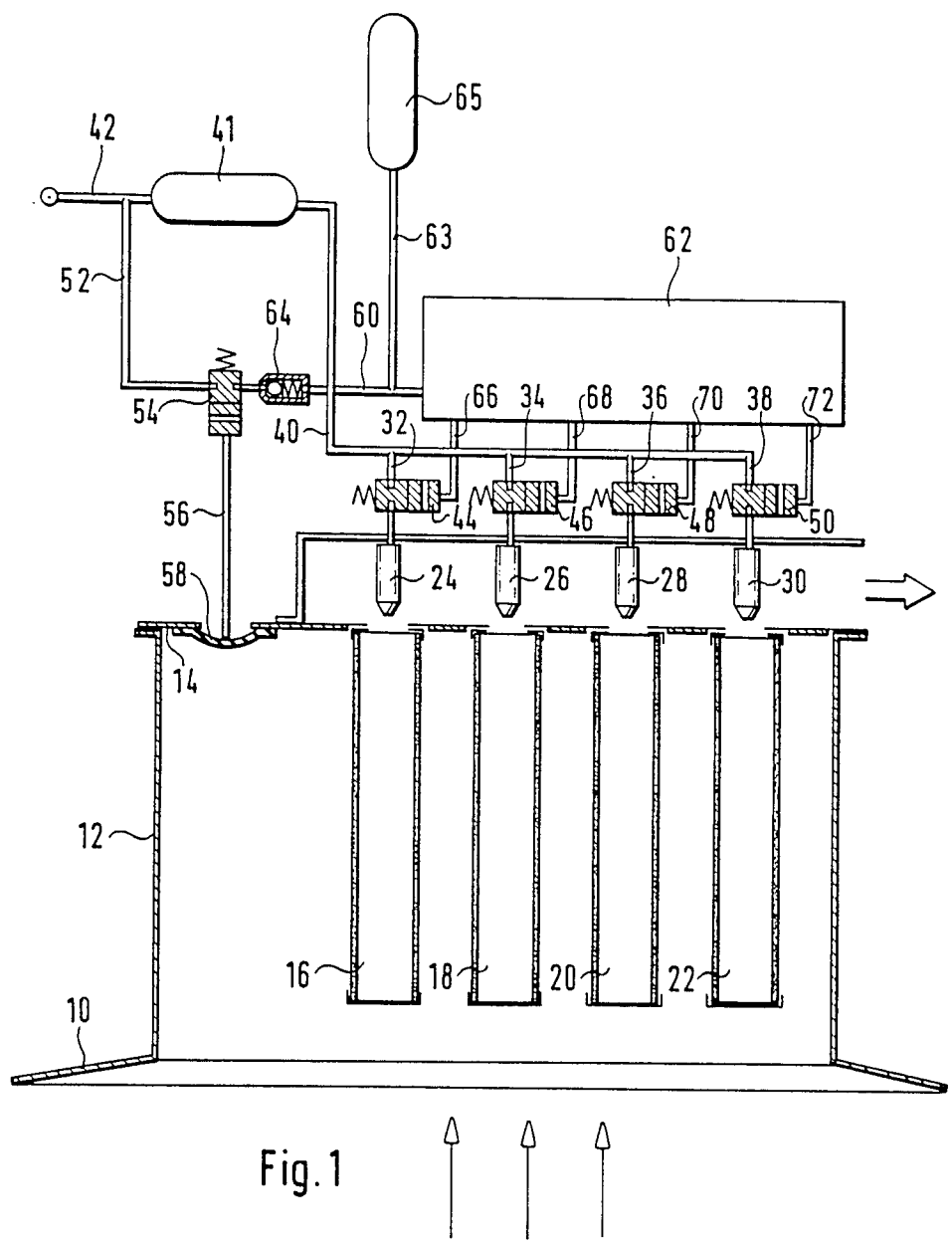

United States Patent [19]

Stanelle

[11] Patent Number: 4,726,820
[45] Date of Patent: Feb. 23, 1988

[54] PROCESS FOR CLEANING THE DUST FILTER OF A SILO

[76] Inventor: Karl-Heinz Stanelle, Rosenstrasse 4, D-7129 Güglingen 2, Fed. Rep. of Germany

[21] Appl. No.: 920,148

[22] Filed: Oct. 16, 1986

[30] Foreign Application Priority Data

Oct. 19, 1985 [DE] Fed. Rep. of Germany ....... 3537226

[51] Int. Cl.⁴ ............................................. B01D 46/04
[52] U.S. Cl. ......................................... 55/96; 55/283; 55/293; 55/302
[58] Field of Search .................... 55/96, 283, 284, 293, 55/302, 310, 341 R

[56] References Cited

U.S. PATENT DOCUMENTS

| | | |
|---|---|---|
| 3,073,097 | 1/1963 | Hallett et al. .......................... 55/283 |
| 3,360,907 | 1/1968 | Clark, Jr. et al. ...................... 55/283 |
| 3,394,532 | 7/1968 | Oetiker .................................. 55/302 |
| 3,521,430 | 7/1970 | Vanderlip et al. ................ 55/293 X |
| 3,729,903 | 5/1973 | Espeel et al. .......................... 55/283 |
| 3,735,566 | 5/1973 | Laliwala ........................... 55/283 X |
| 4,113,449 | 9/1978 | Bundy .............................. 55/302 X |
| 4,157,899 | 6/1979 | Wheaton .......................... 55/302 X |
| 4,247,310 | 1/1981 | Borst ...................................... 55/96 |
| 4,299,597 | 11/1981 | Oetiker et al. .................... 55/284 X |
| 4,600,415 | 7/1986 | Barton ........................... 55/341 R X |

FOREIGN PATENT DOCUMENTS

| | | |
|---|---|---|
| 2320004 | 6/1974 | Fed. Rep. of Germany ........ 55/302 |
| 2708947 | 9/1978 | Fed. Rep. of Germany . |
| 1021560 | 3/1966 | United Kingdom .................. 55/302 |
| 1432353 | 4/1976 | United Kingdom . |
| 965476 | 10/1982 | U.S.S.R. ............................... 55/302 |

Primary Examiner—Robert Spitzer
Attorney, Agent, or Firm—Connolly & Hutz

[57] ABSTRACT

Filter hoses in a dust filter of a silo are cleaned by blowing air into the hoses in a shocklike manner when there is a predetermined overpressure in the silo. At least one additional cleaning cycle occurs after the overpressure drops.

9 Claims, 2 Drawing Figures

PROCESS FOR CLEANING THE DUST FILTER OF A SILO

TECHNICAL REALM

The invention is concerned with a process for cleaning the dust filter of a silo by means of air blown into the filter hoses in a shocklike manner, whereby the cleaning process, according to which air is blown into each filter hose at one time, is carried out at an overpressure in the silo which can be pre-determined and, insofar as the this overpressure is still present in the silo, is repeated and whereby air is blown into only one of several available filter hoses at the same time.

Such a dust filter is installed for filtering the exhaust air during the pneumatic filling of a silo with a powdered bulk material such as, for example, cement. During the filling process, the introduced air, which acts as a carrier, flows, together with the fill material, from the outside against the surface of the filter. Since only the air can escape through the filter hose into the atmosphere, the fill material is deposited onto the outer side of the filter surface. As a result, the throughput resistance of the filter hoses is increased according to the degree that they are impacted with fill material. This causes the pressure in the silo to increase. By means of the forced opening of an overpressure valve on the silo, one prevents the overpressure in the silo from reaching a level which can threaten the strength of the silo. Insofar as this forced ventilation is invoked during a filling procedure, fill material is blown out of the silo along with the air, which is very undesirable for economic reasons as well as and especially because of the pollution of the environment.

STATE OF THE ART

From GB-PS No. 1 432 353 and U.S. Pat. No. 3,073,097, filters of the type mentioned, in the form of filter hoses which are open above or filter cartridges, are known. The raw gas consisting of, for example, the air and the fill material flows from the outside against the filter surface which is sealed on all sides. Thus, the fill material is deposited onto the filter surface so that only the pure gas can penetrate into the interior of the filter hoses and there, escape to the outside of the silo via the filter hoses which are open above. For the purpose of cleaning the filter hoses, compressed air is blown, in a shocklike manner, from above whereby the fill material deposited on the outer side of filter hoses is loosened from the walls of the filter hoses and falls back into the silo. The control of the cleaning process can occur electrically or pneumatically. The cleaning process is always started only at a pre-determined overpressure. The fill material loosened by means of the compressed air from the outer side of the filter does not fall completely into the silo but deposits inevitably, at least partially, onto the outer side of neighboring filters or of the same filter. After the pressure in the silo drops below the value which triggers the cleaning process, the result is that more or less dirty filters are present. With silos which are only filled at greater intervals while the fill material is drawn off relatively slowly, the filter hoses are in a dirty condition during the interval between two filling procedures. The fill material can cake on the filter hoses during this time interval, which has a disadvantageous effect upon the life of the filter the higher the humidity is and the longer the period between fillings.

From DE-OS No. 27 08 947 a process for de-dusting a filter used in mining is known according to which the compressed air with which the individual filter is impacted for the purpose of cleaning is adjusted in, in its intensity, a variable manner. Even with this process, the cleaning is triggered only at a pre-determined overpressure so that here too the filters are more or less dirty after the ending of the cleaning process.

DESCRIPTION OF THE INVENTION

The objective of the invention is the cleaning of the filter hoses or filter cartridges at the dust filter of a silo by simple means so that after the completion of the cleaning process, all filters are in the cleanest possible condition.

This objective is solved, according to the invention, by means of the process indicated in claim 1. This process distinguishes itself in that after the pre-determinable overpressure drops, a cleaning cycle is carried out again. It is thereby assured that after the drop in overpressure in a silo, filter hoses are further cleaned and namely by further shockwise blowing in of compressed air into the individual filter hoses. At the start of a filling process in a silo even after longer idle periods of same, filters are available on which there is practically no fill material attached. The number of post cleaning cycles which is greater the more mealy the fill material is can be selected so that practically no fill material is attached to the filter hoses after the ending of the cleaning process.

The process according to the invention is furthermore very advantageous in cases where a silo is filled solely for a fill vehicle. At the close of the actual fill process, the air supply in namely interrupted on a regular basis. Under this condition, there is in the silo a certain overpressure which need not be so high as to trigger a cleaning cycle again. The filters are therefore, as a rule, more or less impacted with fill material. Before the fill vehicle is then uncoupled from the silo, a powerful air stream is blown through all supply lines on a regular basis in order to empty the lines as completely as possible. This air stream, in which there is a relatively low percentage of fill material, contributes considerably to the opening of the overpressure valve and to a cloud of dust being blown out of the silo. It has been shown that this can be avoided with certainty if, before the final repeated blowing of air into the silo, the filter hoses are cleaned as completely as possible. This is attained, according to the invention, due to the fact that, after the drop in overpressure, at least one cleaning cycle is carried out again.

The post-cleaning, according to the invention, of the filter hoses can be achieved in a simple manner due to the fact that after a switching unit, which in its ON position, initiates a cleaning cycle, a first control unit is connected which regulates the supply of air into the filter individual hoses and also due to the fact that a second control unit, connected after the switching unit, which is so activated in the ON position of the switching unit that it initiates at least one more cleaning cycle in the OFF position of the switching unit. An automation of the post-cleaning is therewith achieved. It is, namely, assured in all cases that, after the end of a filling process, the fill hoses are, for practical purposes, completely cleaned so that before the start of a new filling process, which can occur minutes or even days or weeks later, completely cleaned filter hoses or filter cartridges are available. A maintenance free and operationally reliable possibility is shown due to the fact that the switching unit, which initiates the cleaning process, is actuated by moving a lever which lies against an expandable membrane. This membrane in turn seals gastight a recess in the housing of the filter. When an overpressure occurs in the silo, the membrane bulges outward and shifts the lever resting against it in such a way that the switching unit is placed in its ON position. As a result of this ON switching, the supply of air in the nozzles which blast the filter hoses with air is regulated.

In an advantageous way, an air storage compartment is used as an additional control unit which, in the ON position of the switching unit, is filled with air, whereby this air is fed, while the switching unit is in the OFF position, to the first control unit which regulates the distribution of the air supply to the filter bases. When the overpressure increases, the result is that the switching unit is activated so that the process of blowing in can occur and, at the same time, the air storage compartment is filled, so that when the overpressure drops and the switching unit switches off, this air storage compartment is in turn filled with air such that this air can be used for at least one more cleaning cycle.

Insofar as only pneumatic components are used for the execution of the cleaning process, one can waive the operation and control of the silo with electrical means. No electrical line need then be installed to the roof of the silo. This prevents the occurrence of those accidents which can not be ruled out when handling electrical components. Of further significance is that operational disturbances due to faulty electrical parts are avoided. The failure rate of such a filter is very greater reduced.

The invention is concerned, aside from this, with a device for carrying out the above process. This invention is distinguished by the fact that an air blasting nozzle is associated with each filter hose such that the air blasted out of a certain nozzle can only flow through the filter hose associated with it. The release of air from an individual nozzle thus cleans only one single filter hose so that with the non-simultaneous blowing of air from the available nozzles, all the filter hoses can never be blasted with air together.

During a cleaning cycle, the escape of raw air through the overpressure valve is thereby impossible.

Further designs and advantages of the invention can be deduced from the additional features given in the claims.

SHORT DESCRIPTION OF THE DRAWINGS

The invention is described in greater detail by means of the embodiments illustrated in the drawings. The features which can be deduced from the description and from the drawings can be applied to other embodiments of the invention, either individually or as a group in a suitable combination.

Figure 2:
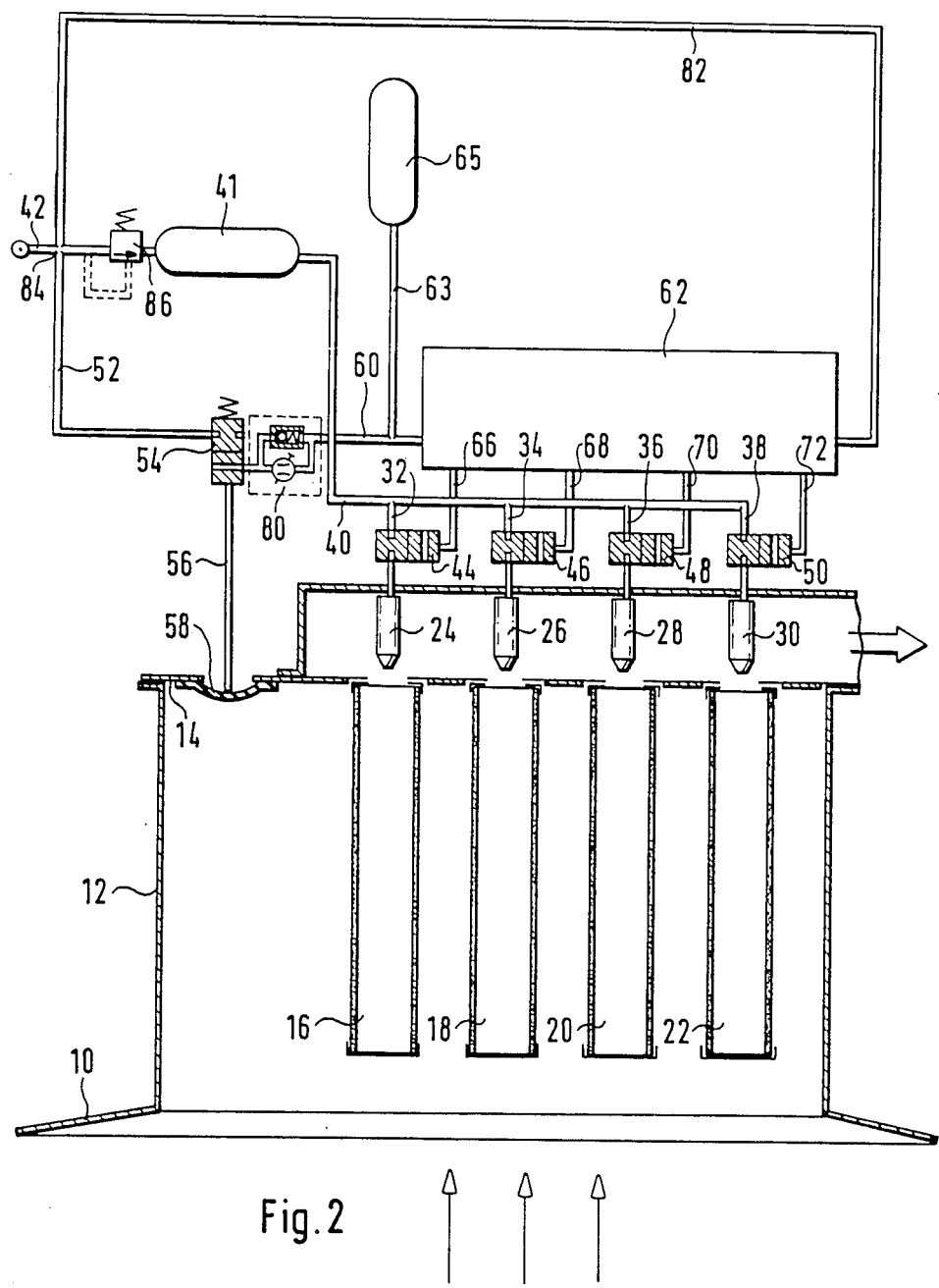

Shown are:

FIG. 1 A schematic illustration of a dust filter installed on the roof of a silo, which has filter hoses which are open at the top, as well as a switching schematic of the controls for the air used in cleaning these filter hoses according to a first embodiment and, FIG. 2 An illustration corresponding to FIG. 1 but according to a second embodiment.

WAYS OF CARRYING OUT THE INVENTION

A hollow cylindrical housing for a filter 12 is mounted on a silo's roof 10. The interior of the filter 12 forms a unit with the interior of the silo.

Four filter hoses 16, 18, 20, 22, open at the top, project from the ceiling 14 of the silo, downward into the filter 12. An air nozzle 24, 26, 28, 30 is mounted above each filter hose 16, 18, 20, 22 so that the orifice of each nozzle is located in the region of the opening of its corresponding filter hose. Each nozzle is connected, via a tap line 32, 34, 36, 38, to a circular line 40 which is in turn connected to a supply line 41 and the latter being continually connected with a compressor, via a supply line 42. Inside each tap line, there is a branching valve 44, 46, 48, 50 by means of which the supply of air coming from the compressor into each nozzle 24, 26, 28, 30 is released or shut off.

From the supply line 42, an air line 52 branches off which leads to a switch 54. This switch is a two way valve which is controlled by means of a sensor lever 56. The sensor lever 56 rests against a membrane 58 which seals, gastight, a recess which is present in the ceiling 14 of the filter 12.

An additional air line 60 goes from the switch 54 to a valve block 62. A check valve 64, which allows the air to pass from the switch 54 only in the direction of the valve block 62, is built into the air line 60. An additional air line 63 branches from the air line 60 to an air storage vessel 65. Between the valve block 62 and a valve 44, 46, 48, 50 there is a pneumatic line connection 66, 68, 70, 72 by means of which these two way valves are controlled. This control occurs pneumatically against a return spring which holds the valve in its OFF position.

The supply of air from the compressor in the supply vessel 41 and from the latter through the nozzles into the filter hoses functions as follows:

Compressed air is constantly applied against the nozzles via the lines 42, 40. In the resting position, the valves 44, 46, 48, 50 are in their shut off position, as shown in the drawing, so that the air cannot be blown through the nozzles into each filter hose.

The air line 52 is also constantly filled with compressed air. As soon as a certain overpressure has built up in the silo and thereby in the interior of the filter 12 while a certain amount of fill materials have been deposited on the outer side of the filter hoses, the membrane 58 bulges upward so far that the sensor lever 56, which likewise shifts upward opens the switch 54 against the force of a return spring. As a result of this, the air can flow out of the line 52 into the valve block 62 via the line 60, as well as into the air storage vessel 65. The air then flows from the valve block 62 to the valves 44, 46, 48, 50 via the line connections 66, 68, 70, 72. The logical switching function provided in the valve block 62 is such that the four valves 44, 46, 48, 50 are opened one after the other. Thus, before the vent valve is opened, the previous valve is closed. This way, air is always blown in only one filter hose. During this blowing process, the air storage vessel 65 is under an overpressure.

The cleaning process is repeated in cycles which follow one another as long as the membrane remains in its upward bulging position. The air needed for this is drawn from the air supply vessel 41. Insofar that the supply line 42 has adequately large dimensions, this air supply vessel 41 can be waived. As soon as the overpressure in the filter and therewith in the silo has dropped below a desired value and the membrane 58 has sunk from its maximum bulged position, the sensor lever 56 likewise shifts downward so that the switch 54 assumed its position as shown in the drawing. In this position, the air supply in the line 60 is interrupted. Then, the air escapes out of the storage vessel 65. Because of the check valve in the line 60, this air from the storage vessel 65 can only escape into the valve block 62. As a result of this, the valve block 62 is acted upon with air so that the valves 44, 46, 48, 50 can be shifted to their ON position. Another cleaning cycle takes place because of this. Following this, the overpressure in the storage vessel 65 is reduced so that the valve block 62 cannot be acted upon by controlling air. Because of this, in turn, the cleaning process as a whole is terminated. At this point, the filter hoses are completely cleaned. The vent cleaning process starts up when a certain overpressure has built up inside the filter 12 again and when, as a result, the membrane 58 has bulged to a certain measure.

Characteristic of the illustrated cleaning process is that two cleaning processes are actuated by the membrane 58: In its bulged position, the membrane 58 actuates a first cleaning process directly while it indirectly initiates a second cleaning process by means of the air storage vessel 65.

The number of filter hoses or filter cartridges in a filter 12 depends on the size of the filter 12 and is in no way limited to the four filter hoses shown in the drawing. When installing the filter hoses, one must take into consideration that the respective distance is to be chosen such that, when a filter hose is cleaned, the fill material loosening from its surface falls sown into the silo and does not deposit onto the neighboring filter hose.

It is not absolutely necessary that air is always blown into only one filter hose. Air can even be blown into two or three filter hoses at the same time. The important thing is only that air is not blown into all filter hoses at the same time and that there are always enough filter hoses still available for the escape of pure air so that an overpressure capable of opening the overpressure relief valve can build up.

The illustration according to FIG. 2 exhibits the following differences with respect to FIG. 1.

No check valve, as in FIG. 1, is present in FIG. 2. There is, however, at the switch 54, a throttling valve 80 which , in the ON position of the switch 54, permits the compressed air to flow freely out of the line 52 into the line 60 and thus further into the valve block 62 as well as into the air storage vessel 65. Like in the illustration in FIG. 1, the air then flows, via the line connections 66, 68, 70, 72, when the switch 54 is in the ON position to the valves 44, 46, 48, 50 so that the latters are switched as already thoroughly described above. In the opposite direction, that is, to the left in the drawing, the amount of air traveling from the air storage vessel 65 through the line 63 and the line 60 in the direction of the switch 54 can be in curtailed quantity. It is thus possible to suitably adjust the amount of air which flows from the air storage vessel 65 into the valve block 62 by adjusting the throttling valve 80. The amount of air which flows through the lines 66, 68, 70, 72 for adjusting the valves 44, 46, 48, 50 can also be adjusted therewith. This means that the number of cleaning cycles which are to occur after the drop of the membrane 58 and the lowering of the overpressure in the silo 10 can be variably adjusted.

The additional modification in the illustration according to FIG. 2 is concerned with the case where the valves 44, 46, 48, 50 are not acted upon by compressed air from the respective lines 66, 68, 70, 72 against the resistance force of a spring. In order to prevent the valves 44, 46, 48, 50 from remaining in a so-called "floating" position in which they are neither completely shut nor completely open, a line 82 is provided by means of which compressed air is fed into the valve block 62 so that the valves 44, 46, 48, 50 are brought to their OFF positions which corresponds to their normal position and the position shown in FIG. 2. This line 82 branches from the line 42 before air supply vessel 41 at point 84. Between point 84 and the air supply vessels 41, there is a pressure safety valve 86 in the line 42. This valve 86 only opens if a certain overpressure has occurred. Before compressed air can flow into the line 40 and thus to the valves 44, 46, 48, 50, compressed air has already flowed through the line 82 into the valve block 62 and brought the valves 44, 46, 48, 50 to the position shown in FIG. 2, provided that they were not already in that position. The compressed air which is against these valves by means of the line 40 thus cannot flow out uncontrolled through the nozzles 24, 26, 28, 30. The cleaning process itself then runs as already described above.

I claim:

1. Process for cleaning the dust filter of a silo by means of air blown in a shocklike manner into the filter hoses of a filter, whereby the cleaning process, according to which air is blown once into each filter hose when a pre-determined overpressure occurs in the silo, is carried out and repeated as long as this overpressure is still present in the silo and whereby air is blown in only one of several filter hoses at a time, the improvement being in that after the overpressure drops, at least one more cleaning cycle is carried out by blowing air in a shocklike manner into the filter hose against the walls of the hose.

2. Process according to claim 1, characterized therein that a switching unit which, in its ON position initiates a cleaning cycle, a first control unit is connected which regulates the supply of air in the individual filter hoses and that a second control unit is connected after the switching unit, with said control unit being activated in the ON position of the switching unit so that it initiates at least one more cleaning cycle in the OFF position of the switching unit.

3. Process according to claim 2, characterized therein that the switching unit is actuated by the shifting of a lever which rests against a bulging membrane which in turn seals, in a gastight fashion, a recess in the filter housing so that the switching unit is brought to its ON position as a pre-determined overpressure is reached in the silo and therewith the membrane in the filter housing bulges and as a result, the lever is shifted far enough to actuate the switching unit.

4. Process according to claim 3, characterized therein that, as a second control unit, an air storage vessel is used which is filled with air while the switching unit is in the ON position, whereby this air is fed while the switching unit is in the OFF position, to the first control unit which regulates the supply of air into the individual filter hoses.

5. Process according to claim 1, characterized therein that only pneumatic components are used for carrying out the cleaning process.

6. In a device for cleaning the dust filter of a silo by means of air blown in a shocklike manner into the filter hoses of a filter whereby air is blown once into each filter hose when a pre-determined overpressure occurs in the silo and the cleaning process is carried out and repeated as long as overpressure is still present in the silo and whereby air is blown in only one of several filter hoses at a time, the improvement being in an air blasting nozzle being provided for and associated with each filter hose, means for blasting air from each of said nozzles only to its corresponding hose, and means for blasting air from said nozzles after the overpressure drops.

7. Device of claim 6 including switching means for initiating the cleaning cycle when said unit is in its ON position, first control means for regulating the supply of air to said filter hoses, second control means connected to said switching means and being activated when said switching means is in its ON position to initiate at least one additional cleaning cycle when said switching means is in its OFF position.

8. Device of claim 7 including a lever for actuating said switching means, said lever being disposed against a membrane which seals a recess in the filter housing, said membrane bulging outwardly in response to a pre-determined overpressure in the silo to shift said lever and cause said lever to actuate said switching means.

9. Device of claim 8 wherein said second control means includes an air storgae vessel which is filled with air when said switching means is in its ON position whereby air is fed to said first control means while said switching means is in its OFF position to regulate the supply of air into the individual filter hoses.

* * * * *